United States Patent [19]

Hiestand

[11] Patent Number: 4,758,006
[45] Date of Patent: Jul. 19, 1988

[54] APPARATUS FOR OPERATING THE CLAMPING JAWS OF A CHUCK

[75] Inventor: Karl Hiestand, Pfullendorf, Fed. Rep. of Germany

[73] Assignee: SMW Schneider & Weisshaupt GmbH, Meckenbeuren, Fed. Rep. of Germany

[21] Appl. No.: 18,628

[22] Filed: Feb. 25, 1987

[30] Foreign Application Priority Data

Feb. 25, 1986 [DE] Fed. Rep. of Germany ....... 3605957
Dec. 11, 1986 [DE] Fed. Rep. of Germany ....... 3642309

[51] Int. Cl.$^4$ ..................... B23B 31/24; B23B 31/26
[52] U.S. Cl. ........................................ 279/1 H; 279/4
[58] Field of Search .................................. 279/1 H, 4

[56] References Cited

FOREIGN PATENT DOCUMENTS 3218084 11/1986 Fed. Rep. of Germany .
416153 9/1934 United Kingdom ............... 279/1 H Primary Examiner—Gil Weidenfeld
Assistant Examiner—Steven C. Bishop
Attorney, Agent, or Firm—Becker & Becker, Inc.

[57] ABSTRACT

An apparatus for operating the clamping jaws of a chuck. The clamping jaws are coupled with an adjustment member which, for producing an adjustment movement is in driving connection with an adjusting drive mechanism. The latter is formed by a two-part rotary motor that is disposed externally of the main spindle and is concentric thereto. The rotary motor is rotatably mounted as a self-contained unit. One functional member of the rotary motor is driveable directly by the main spindle and is drivingly supported thereon. The other functional member is drivingly connected with the adjustment member. To maintain the clamping force, the two functional members can be positively secured to one another. To undertake an adjustment movement, the two functional members can be infinitely variably moved relative to one another.

20 Claims, 6 Drawing Sheets

APPARATUS FOR OPERATING THE CLAMPING JAWS OF A CHUCK

BACKGROUND OF THE INVENTION

The present invention relates to an apparatus for operating the clamping jaws of a heavy-duty or power chuck that is part of a machining tool, with the clamping jaws being radially displaceably guided in a driven chuck body. The clamping jaws are coupled with a rotatable or axially displaceable adjustment member via wedge-type members, wedge hooks, levers, or similar intermediate means, and the adjustment member is in driving connection with an adjusting drive mechanism for producing an adjustment movement.

An apparatus of this general type is known from German Offenlegungsschrift No. 32 18 084-Bald dated Nov. 13, 1986. The adjusting drive mechanism of this known embodiment comprises an overlapping gear arrangement, the input member of which is supported on the main spindle of the machining tool, and the output member of which is connected with a movement-conversion system via which the alteration of the clamping force exerted upon a workpiece is effected; this known gear arrangement also comprises a variably embodied adjustment energy converter. To avoid large rotating masses, the adjustment energy converter is stationary and cooperates with an overlapping input provided between the input member and the output member of the gear arrangement, so that a torque can be produced between these two parts for an adjustment movement.

The adjustment energy converter can be in the form of an electromagnetic converter for producing alternating magnetic fields, or it can be embodied for the conversion of mechanical energy into the energy of alternating magnetic fields, with the operative connection to the transmission input of the overlapping gear arrangement being effected by a magnetic coupling. However, it is also possible to use an electric motor or a compressed air motor as the adjustment energy converter.

To reinforce the moment of reaction, the adjustment energy converters, the drive moment of which at the overlapping input of the gear arrangement is applied to the latter, should be arranged stationarily, which means that a considerable amount of space is absolutely necessary. Aside from the fact that the overlapping gear arrangement is similarly large, and is expensive to manufacture, it is very expensive to supply the power needed by the gear arrangement for producing an adjustment movement. If an electric motor or a compressed air motor is provided as the adjustment energy converter, it is necessary, in order to provide a driving connection with the overlapping gear arrangement, to connect at the output side of the converter a planetary gear system that continuously rotates at the speed of the main spindle of the machining tool. Aside from the fact that undesirable noises are caused by the continuously rotating planetary gear system, with this heretofore known apparatus not only is the capital expenditure extremely high for producing for an adjustment movement, so that the apparatus is expensive to manufacture, but, due to the large number of components that are required and that take part in the transfer of force, considerable power and efficiency losses have to be taken into consideration, and the susceptibility to breakdown is considerable.

It is therefore an object of the present invention to provide an apparatus of the aforementioned general type with which it is possible to operate the clamping jaws of a chuck at any time, even during operation of the spindle at high speeds, in an extremely reliable manner without having to directly engage the machining tool, and without requiring a particularly great capital expenditure. Rather, for this purpose, only a very small amount of space should be required in the region of the main spindle, and no or only slight thermal stresses and efficiency losses should occur due to friction. Furthermore, a clamping force should be easy to adjust and alter without difficulty, and should also be continuously maintained and should be capable of reproduction with no problems for the same conditions. However, above all, the inventive apparatus should be easy to handle, should be extremely reliable, and should have a long service life.

BRIEF DESCRIPTION OF THE DRAWINGS

These objects, and other objects and advantages of the present invention, will appear more clearly from the following specification in conjunction with the accompanying drawings, in which.

SUMMARY OF THE INVENTION

Figure 1:
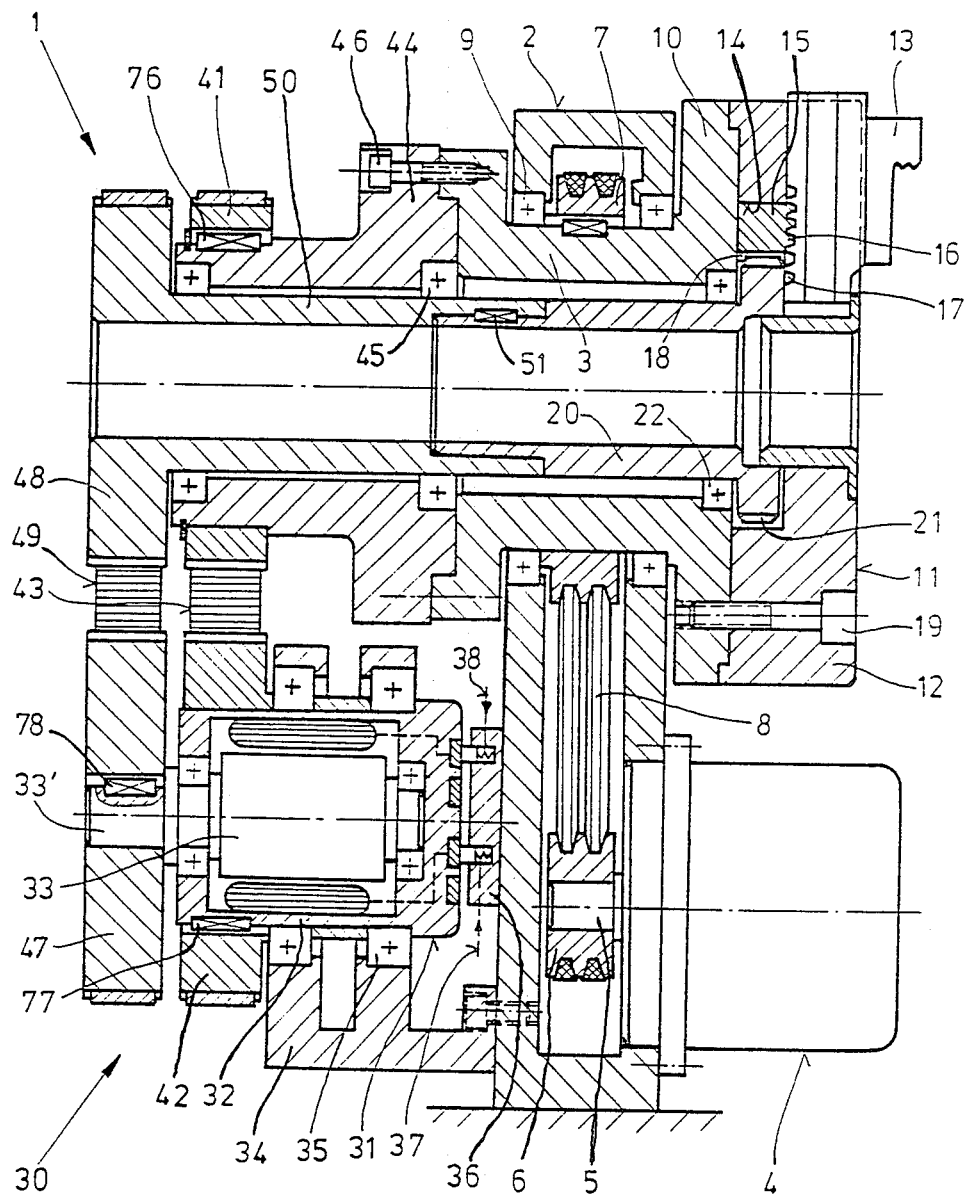
FIG. 1 is an axial cross-sectional view of one inventive embodiment of an apparatus associated with a chuck for operating the clamping jaws via a rotatable adjustment member, with an electric motor being provided as the adjusting drive mechanism.

The apparatus of the present invention is characterized primarily in that the adjusting drive mechanism is formed exclusively by a known, two-part rotary motor that is disposed externally of the main spindle of the machining tool and is concentric thereto, with the rotary motor being rotatably mounted as a self-contained unit, and having a first functional member, preferably the stator of the motor, and a second functional member, preferably the rotor of the motor, with the stator being driveable by the main spindle, for example directly thereby, and being drivingly supported on the latter, and with the rotor being drivingly connected with the adjustment member; the two functional members of the rotary motor, i.e. the stator and the rotor thereof, or further components that take part in the transfer of force, can, via the rotary motor, be positively secured to one another to maintain a clamping force, and infinitely variably moved relative to one another to effect an adjustment movement.

It is very advantageous to undertake the securing and/or adjusting of the functional members of the rotary motor relative to one another via the energy supplied thereto.

Pursuant to a preferred embodiment of the present invention, the rotary motor is rotatably mounted in a holder that is connected to the machining tool, and the stator is in driving connection with the main spindle.

It is furthermore expedient if one of the functional members of the rotary motor, for example the stator thereof, is drivingly connected with the main spindle, and is supported thereon, via transmission means, preferably a toothed belt that meshes with pulleys that are fixedly disposed on the aformentioned functional member and on the main spindle. The other functional member of the rotary motor, for example the rotor thereof, is expediently drivingly connected with the adjustment member, also via transmission means, preferably a toothed belt that meshes with pulleys that are fixedly disposed on this other functional member and on either the adjustment member or an intermediate member, such as an extension or sleeve, that is connected with the adjustment member.

In a straightforward embodiment, the rotary motor can be embodied as an electric motor or as a hydraulic displacement-type motor that is acted upon by pressure medium.

To convert the rotational movement from the rotary motor to an axial movement, the adjustment member, or an intermediate member, such as a sleeve, connected to the adjustment member, is non-rotatably supported and, via a screw drive, preferably a rolling screw drive in the form of a rolling ball spindle or the like, is connected with a component, such as an extension or a planetary gear system, that is driven by the rotary motor.

Pursuant to another type of embodiment, to convert a relative rotation of the rotor of the rotary motor relative to the stator thereof, it is also possible to provide a hydraulic system that is in the form of a liquid column and that acts upon a piston which is connected with the adjustment member and to which liquid can be applied on both sides; this liquid column can be displaced by a pump that operates as a function of the relative rotation of the two functional members of the rotary motor, i.e. the rotor and stator thereof.

In this connection, it is advisable that the pump, which is preferably embodied as a geared pump, be placed in a housing which rotates with the main spindle, and be drivingly connected with that functional member of the rotary motor, namely the rotor, that is adjustable relative to that functional member, namely the stator, that is driveable by the main spindle. In addition, a compensating reservoir should be associated with the hydraulic system.

It is furthermore expedient that the adjustment member be driveable via a reduction gearing that is connected ahead of it and rotates with the main spindle.

It is furthermore advantageous to place the rotary motor directly in the housing of the machining tool, and to have the functional members thereof, which are adjustable relative to one another, be in driving connection with the main spindle and with the adjustment member, for example via gear wheels as transmission means. In such a situation, the rotor of the rotary motor should be in driving connection with the main spindle, and the rotatably mounted stator of the motor should be in driving connection with a sleeve that is rotatable on the main spindle, and the sleeve, via a screw drive, is coupled with the adjustment member, which is connected to the main spindle in a nonrotatable and axially displaceable manner.

Pursuant to a different type of embodiment, the stator of the rotary motor can be in driving connection with the chuck body of a chuck that is connected to the machining tool, and the rotor thereof can be in driving connection with the adjustment member that is disposed in the chuck.

For this purpose, the chuck body can be provided with a pulley or toothed rim that is secured thereto and by means of which the chuck body, via a toothed belt, can be drivingly connected with the stator of the rotary motor. To drivingly connect the rotor of the rotary motor with the adjustment member, there can be placed in the chuck body of the chuck, a planetary gearing, the internal gear of which has a pulley or toothed rim that is connected with the rotor of the rotary motor via a toothed belt, with the internal gear, via planet pinions that are rotatably mounted in the chuck body, being in driving connection with a sun wheel which, via a screw drive or the like, acts upon the adjustment member.

The inventively embodied apparatus for operating the clamping jaws of a chuck makes it possible, with extremely little expenditure of energy, not only to have an adjustment of the clamping jaws, and an infinitely variable and precisely adjustable variation of the clamping force that is transmitted from the clamping jaws onto a workpiece that is being clamped-in, even during operation of the machining tool, but also the provision, for a chuck, of a drive system that is small, especially in the region of the main spindle, is not sensitive to failures, and requires only little maintenance. Above all, it is no longer necessary to provide drive means comprised of a piston and cylinder. Thus, nearly no heat is generated, nor is it necessary to take into account any loss in efficiency or power due to friction. If, as the adjustment energy converter, a two-part rotary motor is provided as a unit that is externally rotatably mounted, and the functional members of which can be positively secured to one another, but also can be adjusted in a defined manner, then it is possible, after a state of equilibrium has been reached, to secure the rotary motor to maintain the clamping force that has been applied. Since the rotary motor consumes energy only when an adjustment movement of the clamping jaws is to be undertaken, and the components of the motor rotate together during operation, the power consumed is correspondingly slight and the drive motor can thus be made correspondingly small.

A further advantage is that in order to accommodate those components that take part in the transfer of force in the region of the main spindle, very little space has to be available. These components can be disposed on the main shaft, and therefore workpiece implementation by the main spindle can also be realized without difficulty. Furthermore, the weight of these components, and hence also the forces due to the inertia thereof, are small. Accordingly, the power required to accelerate these components is similarly less than that of a drive means comprised of a piston and cylinder, i.e. of the heretofore known adjusting drive mechanism. And since for the most part commercially available components can be used, the manufacturing costs of the inventive apparatus are low. Furthermore, the inventive apparatus operates reliably even under extreme operating conditions, and requires practically no maintenance. Nevertheless, there can always be built up in a very short period of time, a clamping force which conforms to the respective requirements, and which can also be reproduced without difficulty as a function of the oppositely directed torques of the two functional members of the rotary motor.

Further specific features of the present invention will be described in detail subsequently.

DESCRIPTION OF PREFERRED EMBODIMENTS

Figure 2:
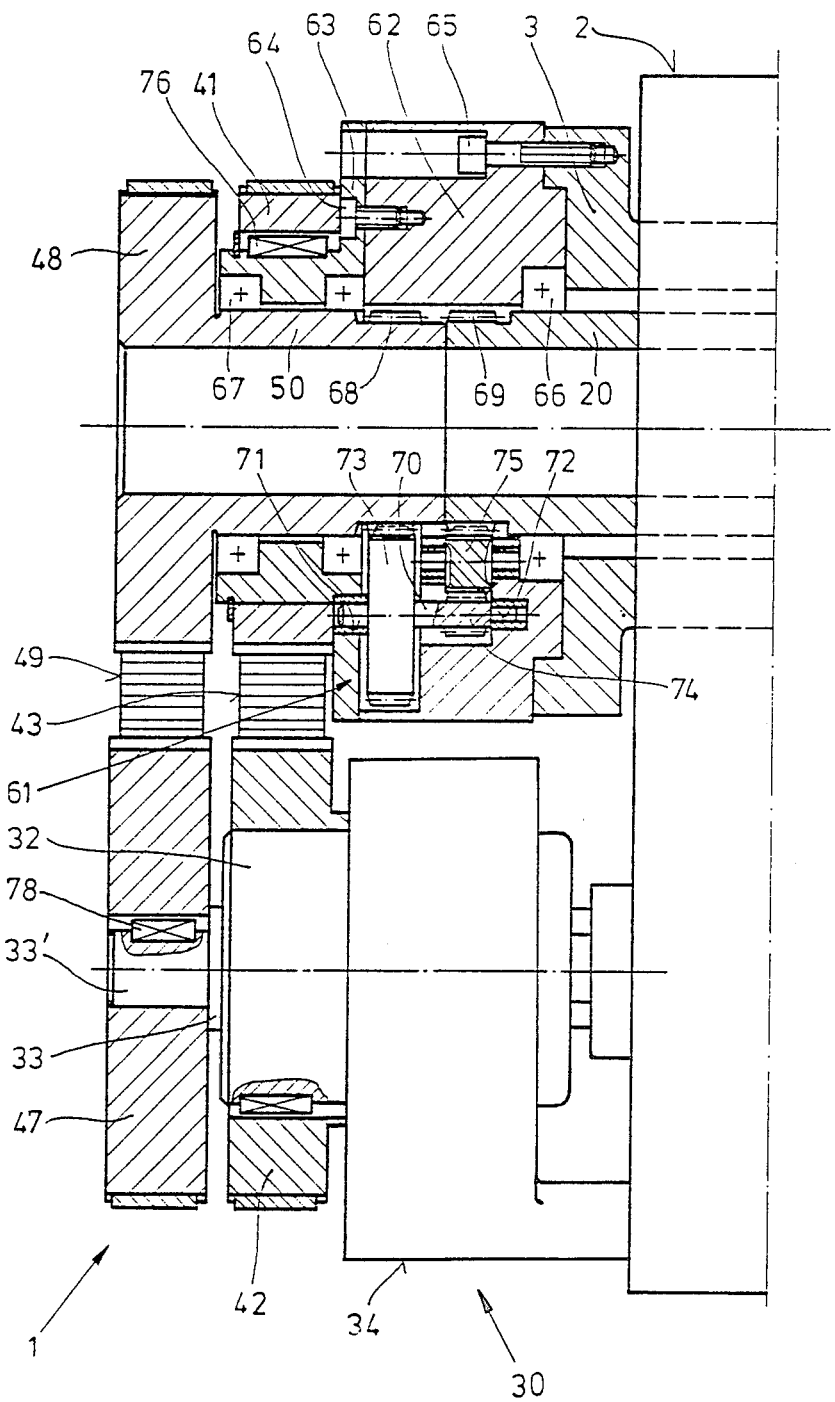
FIG. 2 is a partial axial cross-sectional view, and partially elevational view, of the apparatus of FIG. 1 with a reduction gearing being disposed ahead of the adjustment member.
Figure 3:
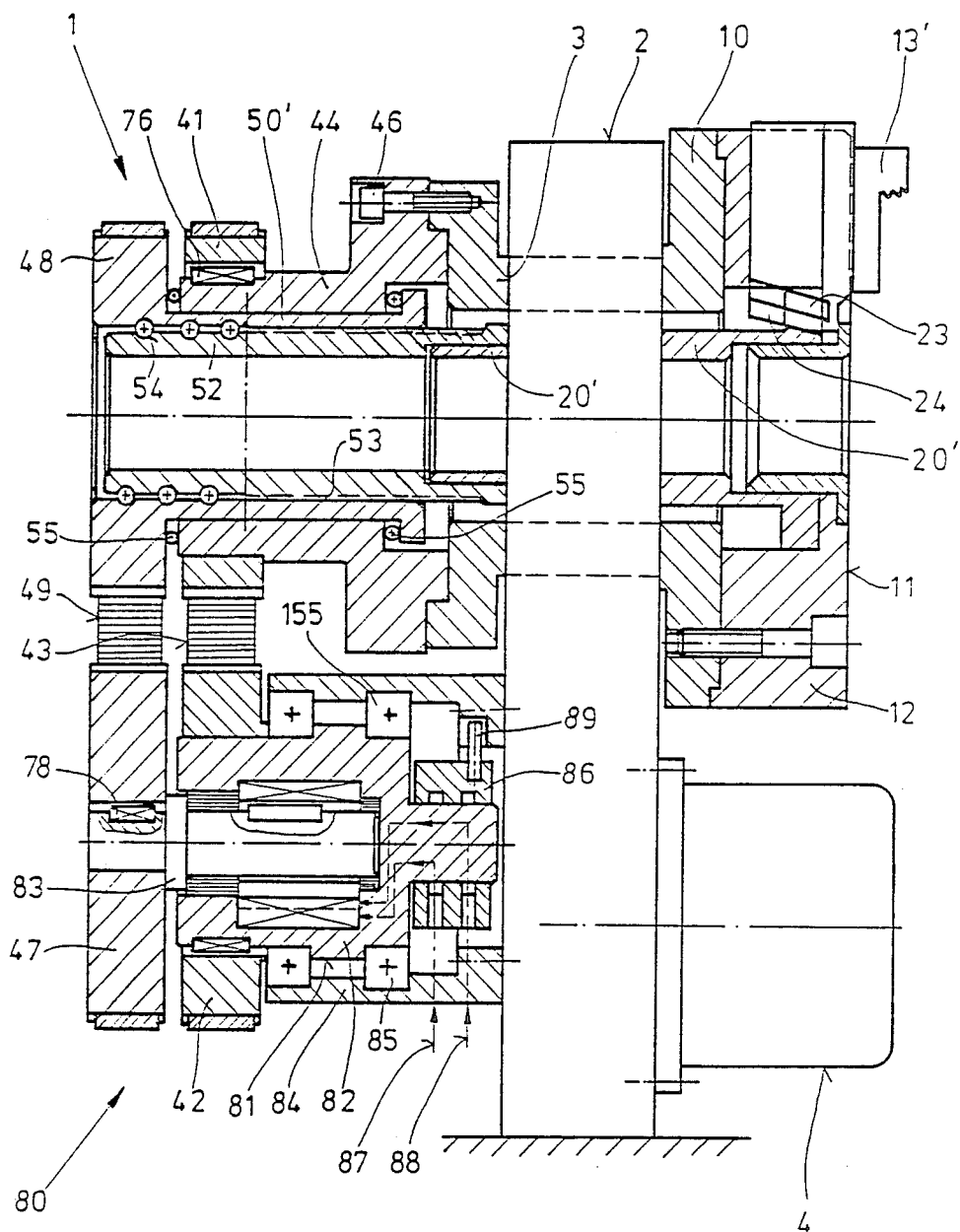
FIG. 3 is an axial cross-sectional view of another inventive embodiment of an apparatus similar to that of FIG. 1 with an adjustment member that is axially displaceable by a screw drive, and, as an adjusting drive mechanism, a rotary motor that is operated by a pressure medium.

Referring now to the drawings in detail, the apparatus 1 illustrated in FIGS. 1 and 3 serves for operating the clamping jaws 13 or 13' of a heavy-duty or power chuck 11 that is disposed on a machining tool 2; the clamping jaws 13, 13' are disposed in a chuck body 12 in such a way as to be radially movable. For this purpose, an adjustment member 20 or 20' is provided. In the embodiment of FIGS. 1 and 2, this adjustment member 20 can be rotated, and in the embodiments of FIGS. 3 to 6, the adjustment member can be shifted axially.

Via a toothed rim 21, the adjustment member 20, which is rotatably mounted by antifriction bearings 22, is drivingly connected with wedge-type or splined members 15, each of which is tangentially displaceably disposed in a recess 14 of the chuck body 12. To effect this driving connection, the inner sides of the splined members 15 are provided with a tooth construction 18. In addition, that face of the splined members 15 that faces the clamping jaws 13 is provided with a further tooth construction 16 that meshes with a tooth construction 17 formed in the clamping jaws 13. In contrast, the axially movable adjustment member 20' is provided with wedge hooks 23 that mesh in wedge hooks 24 formed on the clamping jaws 13', so that the axial movement of the adjustment member 20' is changed into a radial displacement of the clamping jaws 13'.

By means of screws 19, the chuck 11 is securely connected to a flange 10 of the main spindle 3 or 3' of the machining tool 2, which is driven by a motor 4. For this purpose, respective pulleys 6 and 7 are fixedly mounted on the drive shaft 5 of the motor 4 as well as on the main spindle 3, which is supported by bearings 9; the pulleys 6, 7 are drivingly interconnected by V-belts 8.

To drive the adjustment member 20 or 20', and hence the clamping jaws 13 or 13', of the chuck 11 with the apparatus 1, a respective adjusting drive mechanism of varying construction is provided. In FIGS. 1 and 2, this mechanism is designated by the reference numeral 30, in FIG. 3 by the reference numeral 80, in FIG. 5 by the reference numeral 120, and in FIG. 6 by the reference numeral 160. The adjusting drive mechanisms 30, 80, 120, and 160 are in driving connection with the main spindle 3 of the machining tool 2.

In order to accomplish this, in the embodiment of FIGS. 1 to 3, an intermediate piece 44 is secured to the main spindle 3 by screws 46. Via a key connection 76, the intermediate piece 44 supports a pulley 41 that is positively connected with a pulley 42 via a toothed belt 43. The pulley 42 is rigidly mounted via a key connection 77 on a stator 32 of a securable rotary motor 31; the stator 32 is mounted in a stationary holder 34 via antifriction bearings 35. Via a key connection 78, the drive shaft 33' of the motor 31 supports a further pulley 47, which is similarly in driving connection via a toothed belt 49 with a pulley 48. The pulley 48 has an extension 50 on which the intermediate piece 44 is rotatably mounted via antifriction bearings 45. Via this extension 50, and via a key 51, the pulley 48 is connected to the adjustment member 20, so that when the rotary motor 31, which in this embodiment is an electric motor, is connected, the adjustment member 20 in this operating state rotates as a unit and is drivingly connected with the main spindle 3 of the machining tool 2.

In order to undertake an adjustment of the clamping jaws 13 or 13', it is merely necessary to rotate the rotor 33 of the rotary motor 31 to a greater or lesser extent relative to the stator 32 by supplying electrical energy via the lines 37 and 38 as well as a stationary brush holder 36. By means of the belt drive formed by the pulleys 42 and 41 as well as the toothed belt 43, the stator 32 is supported on the main spindle 3. Thus, by rotating the rotor 33, a relative rotation of the two pulleys 42 and 47 relative to one another is initiated, and the rotational speed of the adjustment member 20 is altered for a short period of time, whereupon the clamping jaws 13 or 13' are moved inwardly or outwardly, depending upon the direction of rotation.

In the adjusting drive mechanism 80 of FIG. 3, a hydraulic, positive-displacement motor that operates with pressure medium is provided as the rotary motor 81. Via antifriction bearings 35, the rotary motor 81 is rotatably mounted as a self-contained unit in the holder 84, which is screwed onto the machining tool 2. The pressure medium can be introduced into the motor 81 from lines 87 and 88, via a rotary distributor 86 that is nonrotatably held by a securing pin 89. Accordingly, even during a working cycle, the rotor 83 can be supplied with pressure medium and can thus be rotated relative to the also rotating stator 82 in order, for example, to be able to compensate for a decrease of the clamping force of the chuck 11, as caused by centrifugal force, by a readjustment of the clamping jaws 13 or 13'.

In order to be able to gear down the adjustment movement of the adjusting drive mechanism 30 or 80, in the embodiment of FIG. 2, a reduction gearing 61 in the form of an intermediate gearing precedes the adjustment member 20. For this purpose, the extension 50 of the pulley 48 is provided with a toothed rim 68 with which meshes a rotatably mounted gear wheel 73, on the shaft 70 of which is mounted a further gear wheel 74 that, via an intermediate gear 75, is in driving connection with the adjustment member 20, which is also provided with a toothed rim 69.

The shaft 70, which supports the gear wheels 73 and 74, is rotatably mounted in intermediate pieces 62 and 63 that are securely connected to the main spindle 3 via screws 65, and are rigidly interconnected via screws 64; the intermediate pieces 62 and 63 are provided with bores 71 and 72 for receiving the shaft 70. The intermediate pieces 62 and 63 are rotatably supported on the adjustment member 20 via a bearing 66, and are rotatably supported on the extension 50 via further bearings 67. The intermediate pieces 62 and 63, as well as the gearing 61, thus rotate along with the main spindle 3, and an adjustment of the adjustment member 20, geared down by the gearing 61, is thus effected only by a relative rotation of the pulley 48 relative to the pulley 41.

In order to convert the rotational movement of the pulley 48 relative to the pulley 41 into an axial adjustment movement, in the embodiment of FIG. 3, a screw drive 53 or 54 is provided which, for example as illustrated in the right and left halves, can respectively be embodied as a screw thread or as a rolling screw drive in the form of a rolling ball spindle. The extension 50' formed on the pulley 48 is axially supported via bearings 55, and is rotatably held in the intermediate piece 44. The extension 50' is drivingly connected with a sleeve 52 via the screw drive 53 or 54. A rotational movement of the pulley 48 relative to the pulley 41 is thus converted via the screw drive 53 or 54 into an axial movement of the sleeve 52, so that the clamping jaws 13' of the chuck 11 can be operated by an axial movement of the adjustment member 20'.

Figure 4:
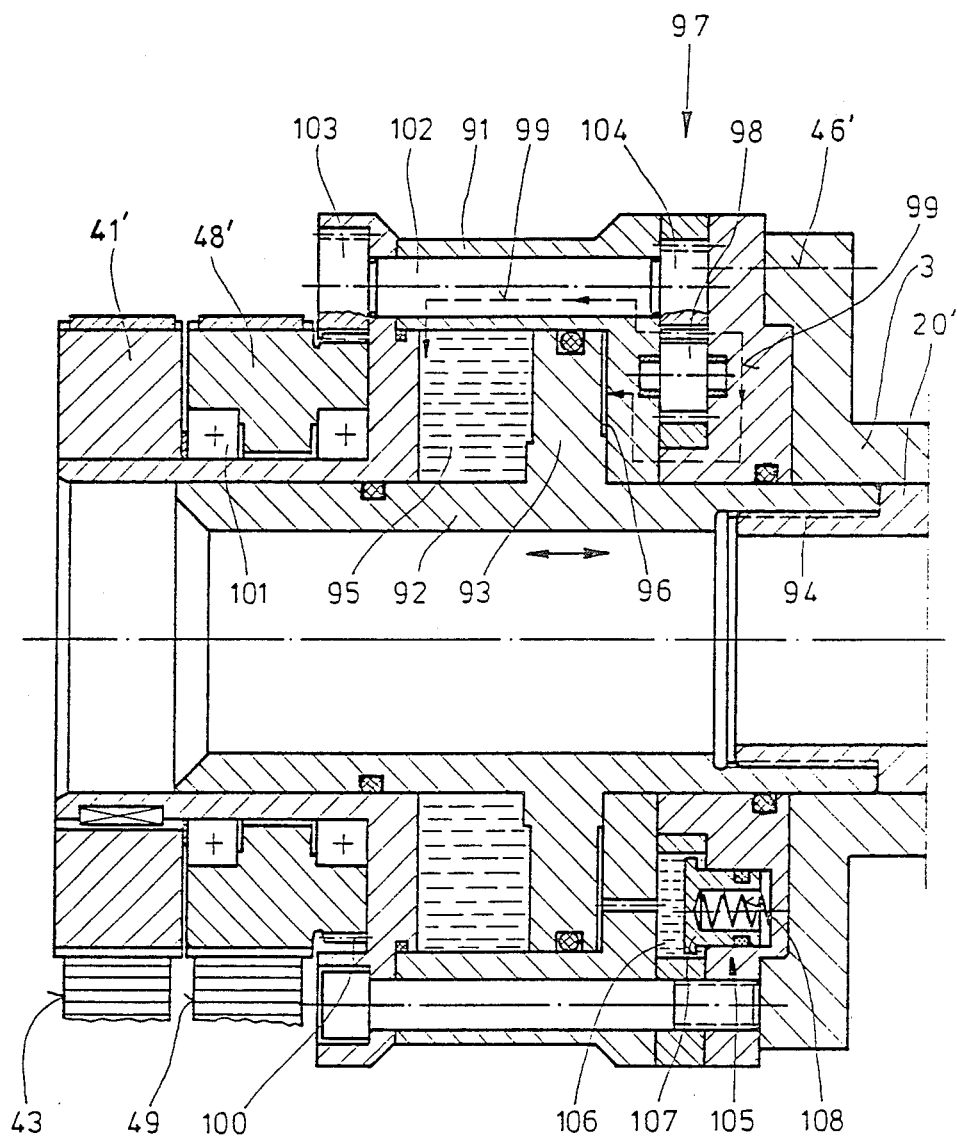
FIG. 4 is a cross-sectional view showing an adjustment member that is axially displaceable via a hydraulic system as a function of the relative rotation of the two functional members of a securable rotary motor.

However, as shown in FIG. 4, it is also possible to convert rotational movement by providing a hydraulic system in the form of a displaceable column of pressure medium. For this purpose, a sleeve 92 is slideably inserted in a housing 91 that is connected by screws 46' to the main spindle 3. Formed on the sleeve 92 is a piston 93, to both sides of which pressure medium can be applied. The sleeve 92 is drivingly connected with the adjustment member 20' by a thread 94. Furthermore a pump 97 is disposed in the housing 91; in the straightforward embodiment illustrated, this pump 97 comprises two driven gear wheels 98 and 104.

In order, when a relative rotation of the two functional members of the non-illustrated rotary motor is initiated, to drive the pump 97, which rotates with the housing 91, the pulley 48' which is rotatably held on the housing 91 via a bearing 101, is provided with a toothed rim 100 with which meshes a gear wheel 103 that is rotatably mounted on a shaft 102 in the housing 91. The gear wheel 104, with which the gear wheel 98 meshes, is also disposed on the shaft 102.

Thus, when there is a relative rotation of the two pulleys 41' and 48' relative to one another, the pressure medium, which is found in the pressure chambers 95 and 96 associated with the piston 93, as well as in the line 99 that connects these pressure chambers and is carried by the pump 97, is moved in the form of a column, so that the pressure increases either in the pressure chamber 95 or in the pressure chamber 96, and the piston 93, as well as the adjustment member 20' coupled therewith, are shifted to a greater or lesser extent to the left or to the right.

In order to be able to compensate for any leakages in the hydraulic system, a pressure reservoir 105 is connected to the pressure chamber 96. This pressure reservoir is formed by a piston 107 that is disposed in a chamber 106 and is acted upon by a compression spring 108.

The operation of the apparatus 1 will now be described in conjunction with the embodiment of FIG. 1. At the beginning of a clamping process, with the main spindle 3 of the machining tool 2 stationary, as soon as the workpiece that is to be clamped in the chuck is placed between the clamping jaws 13, the rotary motor 31 is actuated, so that, via the rotor 33 and via the belt drive formed by the pulleys 47, 48 and the toothed belt 49, the adjustment member 20 is driven and hence the clamping jaws 13 are moved until a state of equilibrium is achieved between the power consumed by the rotary motor 31, and the clamping force exerted by the clamping jaws 13 upon the workpiece. This can, without difficulty, and in an extremely straightforward manner, be adapted to respective requirements and can be reproduced.

Since the rotor 33 of the rotary motor 31 can be secured relative to the stator 32 thereof via the magnetic field that has built up, the overall rotary motor 31, as soon as the main spindle 3 is rotated by the motor 4, and the components connected to the functional members of the rotary motor, are rotated so to speak as a unit. The position of the adjustment member 20 is therefore not altered; rather, the adjustment member 20 is fixed by the secured rotary motor 31, the functional members of which in this operating state cannot rotate relative to one another.

If, however, for example in order to undertake a retightening, the power supply to the rotary motor 31 is altered, or the pressure medium pressure in the rotary motor 81 is increased, the rotor 33 thereof, even with the stator 32 rotating, is rotated relative to the latter in conformity with the power that is supplied, so that the adjustment member 20 is readjusted, and hence the clamping force is increased. The stator 32 of the rotary motor 31 is supported on the main spindle 3 of the machining tool 2 via the pulleys 41 and 42, as well as via the toothed belt 43 that connects these pulleys. A reduction of the clamping force can be realized in a similar manner.

Figure 5:
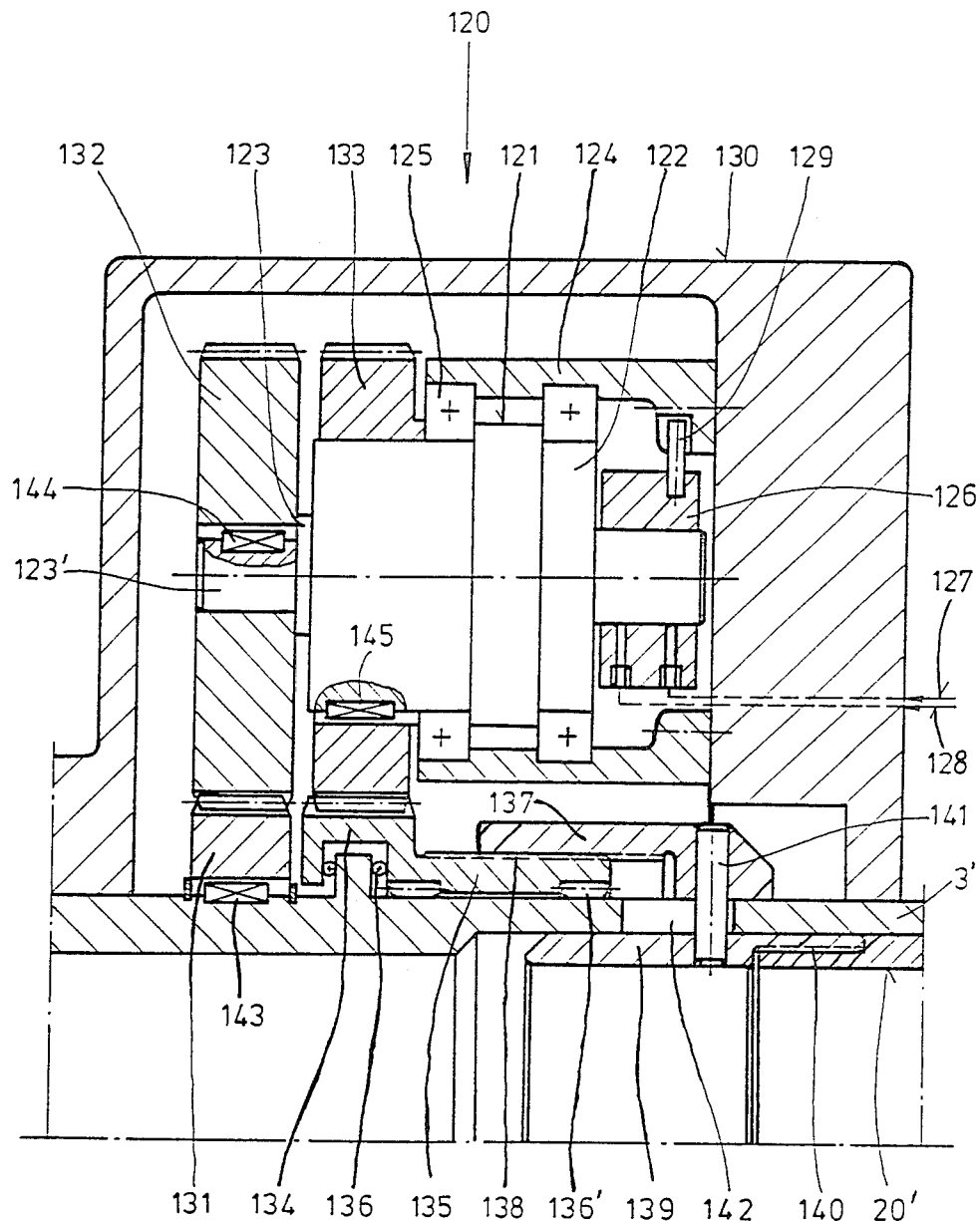
FIG. 5 is a cross-sectional view showing a mechanism built into a housing of a machining tool for the axial displacement of an adjustment member.

In the embodiment illustrated in FIG. 5, the components that form the adjusting drive mechanism 120 are placed directly in a headstock 130 of the machining tool. The stator 122 of the rotary motor 121 is connected to the adjustment member 20' and is rotatably mounted, via antifriction bearings 125, in a holder 124 that is flanged to the headstock 130. In contrast, the rotor 123 of the motor 121 is coupled with the main spindle 3'. In this embodiment, meshing sets of gear wheels 131, 132 and 133, 134 are provided as the gear means.

Thus, the rotor 123 of the rotary motor 121 is driven by the spindle 3' via the gear wheel 131, which is fixedly disposed on the spindle 3' by a key 143, and via the gear wheel 132, which is fixedly connected with the rotor shaft 123' by a key 144. With a relative displacement of the rotor 123 relative to the stator 122, which is similarly fixedly connected to the gear wheel 133 via a key 145, the adjustment member 20' is actuated by the stator.

For this purpose, a sleeve 135 is disposed on the gear wheel 134. Via antifriction bearings 136 and 136', the sleeve 135 is rotatably mounted on the main spindle 3', and is drivingly connected via a thread 138 with a further sleeve 137 that is fixedly connected to the main spindle 3'. Via a pin 141, which is guided in a slot 142 formed in the main spindle 3', and which is coupled with a sleeve 139 connected to the adjustment member 20' by a thread 140, a rotational movement of the gear wheel 134, which movement is initiated by a relative rotation of the stator 122 relative to the rotor 123 of the rotary motor 121, is thus converted into an axial movement and is transferred to the adjustment member 20'. Supply of pressure medium to the rotary motor 121 is effected via pressure medium lines 127 or 128, again by means of a pressure distributor 126 that is nonrotatably held by a pin 129.

Figure 6:
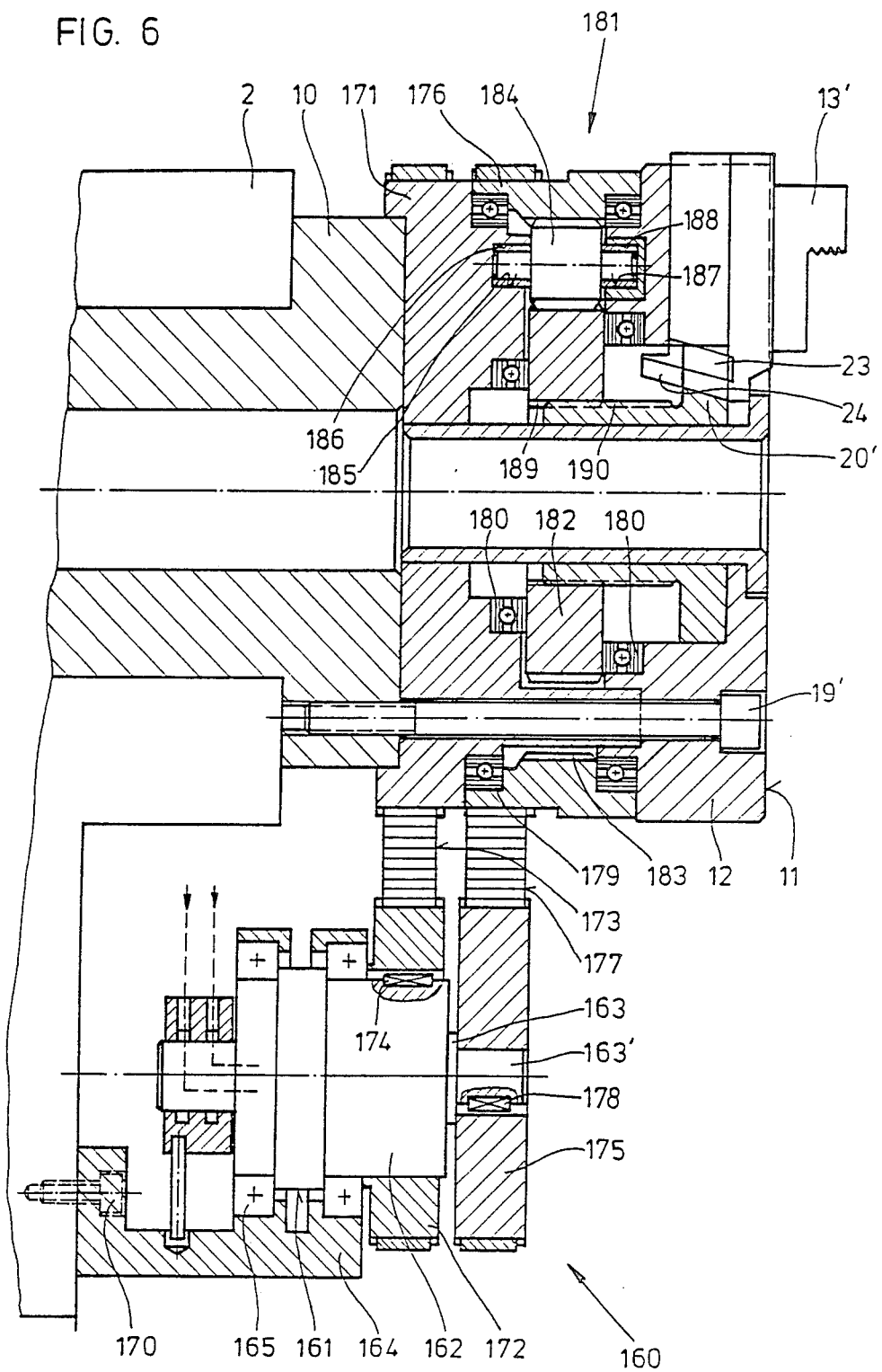
FIG. 6 is a cross-sectional view showing an adjusting drive mechanism that is connected directly with the chuck.

In the embodiment illustrated in FIG. 6, the similarly external and self-contained unit, the rotary motor 161, which via antifriction bearings 165 is rotatably mounted in a holder 164 that is secured to the machining tool 2 via screws 170, is directly drivingly connected with the chuck 11, i.e. with the adjustment member 20' that is disposed in the chuck 11 and is associated with the clamping jaws 13'. For this purpose, a pulley 171 is connected together with the chuck body 12 to the spindle flange 10 via screws 19'. Via a toothed belt 173, the pulley 171 is connected with a pulley 172 that is in driving connection with the stator 162 of the rotary motor 161 via a key connection 174. In a similar manner, namely via a pulley 175 that is nonrotatably disposed on the rotor shaft 163' by means of a key connection 178, and via a toothed belt 177, the rotor 163 of the motor 161 is connected with a pulley 176, which is rotatably mounted on the chuck body 12 by means of bearings 179.

To drivingly connect the pulley 176 with adjustment 20', a planetary gearing 181 is furthermore provided. The sun wheel 182 of the planetary gearing 181 is connected to the adjustment member 20' via a screw thread 190 in the latter and via a screw thread 189, formed in the sun wheel 182. Furthermore, via planet pinions 184 which, by means of bearings 186 and 188, are mounted in bores 185 and 187 formed in the pulley 171 and the chuck body 12 respectively, a sun wheel 182 is connected with an internal gear 183 formed directly in the pulley 176.

The rotational adjustment movement of the rotor 163 of the rotary motor 161, which rotary adjustment movement is effected by a change in the power supply, is thus transferred via the pulley 175 and the toothed belt 177 onto the pulley 176, and from there via the planetary gearing 181 to the adjustment member 20'. The rotational movement of the sun wheel 182, which is axially supported via the antifriction bearings 180, is thereby changed into an axial adjustment movement via the screw drive 189, 190.

The present invention is, of course, in no way restricted to the specific disclosure of the specification and drawings, but also encompasses any modifications within the scope of the appended claims.

What I claim is:

1. In an apparatus for operating the clamping jaws of a chuck that is part of a machining tool, with said clamping jaws being radially displaceably guided in a driven chuck body, which for that purpose is secured to the main spindle of said machining tool, said clamping jaws being coupled with a rotatable or axially displaceable adjustment member via intermediate means, and said adjustment member being in driving connection with an adjusting drive mechanism for producing an adjustment movement, the improvement wherein:

said adjusting drive mechanism is formed exclusively by a two-part rotary motor that is disposed externally of said main spindle and parallel thereto, with said rotary motor being rotatably mounted as a self-contained unit, and having a first functional member and a second functional member, with said first functional member being driveable by said main spindle and being drivingly supported on the latter, and with said second functional member being drivingly connected with said adjustment member; said two functional members of said rotary motor can, via the latter, be positively secured to one another to maintain a clamping force, and be infinitely variably moved relative to one another to effect an adjustment movement.

2. An apparatus according to claim 1, in which said first functional member is the stator of said rotary motor, and said second functional member is the rotor of said rotary motor.

3. An apparatus according to claim 1, in which said selective securing and adjustment of said two functional members relative to one another is effected via the power supplied to said rotary motor.

4. An apparatus according to claim 1, which includes a holder that is connected to said machining tool, with said rotary motor being rotatably mounted in said holder; and in which said first functional member is in driving connection with said main spindle.

5. An apparatus according to claim 1, in which said first functional member of said rotary motor is drivingly connected with, and supported on, said main spindle via first transmission means.

6. An apparatus according to claim 5, in which said second functional member of said rotary motor is drivingly connected with said adjustment member via second transmission means.

7. An apparatus according to claim 1, in which said rotary motor is selected from the group consisting of electric motors and hydraulic displacement-type motors that are acted upon by pressure medium.

8. An apparatus according to claim 1, which includes a component driven by said rotary motor, and in which, to convert rotational motion from said rotary motor into an axial movement, said adjustment member is non-rotatably supported and is coupled with said driven component via a screw drive.

9. An apparatus according to claim 8, which includes an intermediate element disposed between said driven component and said adjustment member.

10. An apparatus according to claim 1, which includes a reduction gearing that is drivingly connected to and ahead of said adjustment member, with said reduction gearing rotating with said main spindle.

11. An apparatus according to claim 1, in which said machining tool includes a housing, with said rotary motor being disposed directly in said housing, and with said functional members, which are adjustable relative to one another, being in driving connection with said main spindle and said adjustment member via transmission means.

12. An apparatus according to claim 1, in which said first functional member of said rotary motor is in driving connection with said chuck body, while said second functional member is in driving connection with said adjustment member, which is disposed in said chuck.

13. In an apparatus for operating the clamping jaws of a chuck that is part of a machining tool, with said clamping jaws being radially displaceably guided in a driven chuck body, which for that purpose is secured to the main spindle of said machining tool, said clamping jaws being coupled with a rotatable or axially displaceably adjustment member via intermediate means, and said adjustment member being in driving connection with an adjusting drive mechanism for producing an adjustment movement, the improvement wherein:

said adjusting drive mechanism is formed exclusively by a two-part rotary motor that is disposed externally of said main spindle and parallel thereto, with said rotary motor being rotatably mounted as a self-contained unit, and having a first functional member and a second functional member, with said first functional member being driveable by said main spindle and being drivingly supported on the latter, and with said second functional member being drivingly connected with said adjustment member; said two functional members of said rotary motor can, via the latter, be positively secured to one another to maintain a clamping force, and be infinitely variably moved relative to one another to effect an adjustment movement; said first functional member of said rotary motor being drivingly connected with, and supported on, said main spindle via first transmission means; said second functional member of said rotary motor being drivingly connected with said adjustment member via second transmission means; said first transmission means including a first pulley that is fixedly disposed on said first functional member, a second pulley that is fixedly disposed on said main spindle, and a toothed belt that meshes with said first and second pulleys; said second transmission means including a third pulley that is fixedly disposed on said second functional member, a fourth pulley that is fixedly disposed on said adjustment member, and a toothed belt that meshes with said third and fourth pulleys.

14. An apparatus according to claim 13, which includes a first intermediate piece that is fixedly secured to said main spindle, with said second pulley being fixedly disposed on said first intermediate piece; and which includes a second intermediate piece that is fixedly secured to said adjustment member, with said fourth pulley being fixedly disposed on said second intermediate piece.

15. In an apparatus for operating the clamping jaws of a chuck that is part of a machining tool, with said clamping jaws being radially displaceably guided in a driven chuck body, which for that purpose is secured to the main spindle of said machining tool, said clamping jaws being coupled with a rotatable or axially displaceable adjustment member via intermediate means, and said adjustment member being in driving connection with an adjusting drive mechanism for producing an adjustment movement, the improvement wherein:
said adjusting drive mechanism is formed exclusively by a two-part rotary motor that is disposed externally of said main spindle and parallel thereto, with said rotary motor being rotatably mounted as a self-contained unit, and having a first functional member and a second functional member, with said first functional member being driveable by said main spindle and being drivingly supported on the latter, and with said second functional member being drivingly connected with said adjustment member; said two functional members of said rotary motor can, via the latter, be positively secured to one another to maintain a clamping force, and be infinitely variably moved relative to one another to effect an adjustment movement; said apparatus to convert a relative rotation of said second functional member of said rotary motor relative to said first functional member thereof, including a hydraulic system that is in the form of a liquid column and acts upon a piston, which is connected to said adjustment member and can be acted upon on opposite sides; and in which includes a pump for displacing said liquid column, said pump being operable as a function of the relative rotation of said two functional members of said rotary motor.

16. An apparatus according to claim 15, which includes a housing that is connected to and rotates with said main spindle, with said pump being disposed in said housing and being drivingly connected to said second functional member of said rotary motor.

17. An apparatus according to claim 16, which includes a compensating reservoir that is operatively associated with said hydraulic system.

18. In an apparatus for operating the clamping jaws of a chuck that is part of a machining tool, with said clamping jaws being radially displaceably guided in a driven chuck body, which for that purpose is secured to the main spindle of said machining tool, said clamping jaws being coupled with a rotatable or axially displaceable adjustment member via intermediate means, and said adjustment member being in driving connection with an adjusting drive mechanism for producing an adjustment movement, the improvement wherein:
said adjusting drive mechanism is formed exclusively by a two-part rotary motor that is disposed externally of said main spindle and parallel thereto, with said rotary motor being rotatably mounted as a self-contained unit, and having a first functional member and a second functional member, with said first functional member being driveable by said main spindle and being drivingly supported on the latter, and with said second functional member being drivingly connected with said adjustment member; said two functional members of said rotary motor can, via the latter, be positively secured to one another to maintain a clamping force, and be infinitely variably moved relative to one another to effect an adjustment movement; said machining tool including a housing, with said rotary motor being disposed directly in said housing, and with said functional members, which are adjustable relative to one another, being in driving connection with said main spindle and said adjustment member via transmission means; said adjustment member being nonrotatably and axially displaceably connected to said main spindle; and a sleeve that is rotatably disposed on said main spindle and is coupled with said adjustment member via a screw drive; said second functional member of said rotary motor being in driving connection with said main spindle, while said rotatably mounted first functional member is in driving connection with said sleeve.

19. In an apparatus for operating the clamping jaws of a chuck that is part of a machining tool, with said clamping jaws being radially displaceably guided in a driven chuck body, which for that purpose is secured to the main spindle of said machining tool, said clamping jaws being coupled with a rotatable or axially displaceable adjustment member via intermediate means, and said adjustment member being in driving connection with an adjusting drive mechanism for producing an adjustment movement, the improvement wherein:
said adjusting drive mechanism is formed exclusively by a two-part rotary motor that is disposed externally of said main spindle and parallel thereto, with said rotary motor being rotatably mounted as a self-contained unit, and having a first functional member and a second functional member, with said first functional member being driveable by said main spindle and being drivingly supported on the latter, and with said second functional member being drivingly connected with said adjustment member; said two functional members of said rotary motor can, via the latter, be positively secured to one another to maintain a clamping force, and be infinitely variably moved relative to one another to effect an adjustment movement; said first functional member of said rotary motor being in driving connection with said chuck body, while said second functional member is in driving connection with said adjustment member, which is disposed in said chuck, said chuck body being provided with tooth means by means of which, via a toothed belt, said chuck body is in driving connection with said first functional member of said rotary motor.

20. An apparatus according to claim 19, in which, to effect said driving connection of said second functional member with said adjustment member, a planetary gearing is disposed in said body of said chuck; said planetary gearing includes an internal gear that has tooth means which, via a toothed belt, is connected with said second functional member; via planet pinions that are rotatably mounted in said chuck body, said internal gear is in driving connection with a sun wheel that acts upon said adjustment member.

* * * * *